(12) United States Patent
Herbst (10) Patent No.: US 6,322,733 B1
(45) Date of Patent: Nov. 27, 2001

(54) METHOD AND APPARATUS FOR CONTROLLING A MOTIONAL SEQUENCE OF A MOVABLE COMPONENT OF A PLASTIC MATERIAL INJECTION MOLDING MACHINE

(75) Inventor: Richard Herbst, Eching (DE)

(73) Assignee: Hekuma Herbst Maschinenbau GmbH (DE)

( * ) Notice: Subject to any disclaimer, the term of this patent is extended or adjusted under 35 U.S.C. 154(b) by 0 days.

(21) Appl. No.: 09/419,333

(22) Filed: Oct. 15, 1999

(30) Foreign Application Priority Data

Oct. 16, 1998 (DE) .............................. 198 47 740

(51) Int. Cl.⁷ .................................... B29C 45/42
(52) U.S. Cl. .................. 264/40.5; 264/334; 425/139; 425/150; 425/444; 700/255
(58) Field of Search ................. 264/40.1, 40.5, 264/328.1, 334; 425/139, 150, 165, 534, 556, 589, 444, 436 RM; 901/6; 700/262, 112, 178, 188, 255; 414/225

(56) References Cited

U.S. PATENT DOCUMENTS

| 3,947,208 | * | 3/1976 | Broderick . | |
| 4,204,824 | * | 5/1980 | Paradis | 425/444 |
| 5,250,239 | | 10/1993 | Herbst . | |
| 6,062,843 | * | 5/2000 | Yamaura | 425/136 |

FOREIGN PATENT DOCUMENTS

| 41 21 841 A1 | 1/1992 | (DE) . |
| 41 10 948 A1 | 10/1992 | (DE) . |
| 197 16 777 A1 | 10/1998 | (DE) . |
| 0 307 091 A2 | 3/1989 | (EP) . |
| 0 688 655 A2 | 4/1995 | (EP) . |
| 62099127 | 5/1987 | (JP) . |
| 08244076 | 9/1996 | (JP) . |
| 10119097 | 5/1998 | (JP) . |

\* cited by examiner

*Primary Examiner*—Jill L. Heitbrink
(74) *Attorney, Agent, or Firm*—Knobbe Martens Olson & Bear, LLP (57) ABSTRACT

A method and an apparatus are disclosed for controlling a motional sequence of a first movable component of a plastic material injection molding machine having a first trajectory spatially overlapping at least partially a second trajectory of a second movable component of the plastic material injection molding machine. Motion of the first movable component is initiated depending on an enabling signal indicative for a motional state of the second movable component. The method comprises the steps of:

a) determining a first period of time ($T_{WA}$; $T_{RE}$) between a first moment in time ($t_{FW}$; $t_{FR}$) when the enabling signal is generated and a second moment in time ($t_6$; $t_3$) when the first movable component enters the second trajectory;

b) determining a second period of time ($T_{RAmax}$; $T_{WEmax}$) between the first moment in time ($t_{FW}$; $t_{FR}$) and a third moment in time ($t_{10}$; $t_8$) when the second movable component leaves the first trajectory;

c) comparing the first period of time ($T_{WA}$; $T_{RE}$) with the second period of time ($T_{RAmax}$; $T_{WEmax}$) and generating a difference signal therebetween; and d) controlling motion of the first movable component as a function of this comparison of the first period of time ($T_{WA}$; $T_{RE}$) with the second period of time ($T_{RAmax}$; $T_{WEmax}$) such that the difference signal is smaller than a predetermined minimum tolerance value ($T_2$; $T_1$).

24 Claims, 6 Drawing Sheets

METHOD AND APPARATUS FOR CONTROLLING A MOTIONAL SEQUENCE OF A MOVABLE COMPONENT OF A PLASTIC MATERIAL INJECTION MOLDING MACHINE

FIELD OF THE INVENTION

The present invention is related to the field of plastic material injection molding. More specifically, the invention is related to methods and apparatuses for controlling the motional sequence of movable components within a plastic material injection molding machine, for example of a mold portion or of a gripper.

Still more specifically, the invention is related to a method for controlling a motional sequence of a first movable component of a plastic material injection molding machine having a first trajectory spatially overlapping at least partially a second trajectory of a second movable component of the plastic material injection molding machine, wherein motion of the first movable component is initiated depending on an enabling signal indicative for a motional state of the second movable component.

Likewise, the invention is directed to a plastic material injection molding machine comprising a first and a second movable component, the components having a first and a second trajectory, respectively, overlapping each other at least partially, a control unit for generating an enabling signal for the motion of the first movable component depending on the motional state of the second component.

BACKGROUND OF THE INVENTION

A method and an apparatus of the kind mentioned at the outset are disclosed in U.S. patent specification 5,250,239 of the same applicant, the contents of which is incorporated herein by way of reference.

From this prior art it is well known to provide a method and an apparatus for controlling the movements or displacements of two components of a plastic material injection molding machine which may be displaced relative to each other. The components are in particular a mold or a mold portion and/or a gripper or, speaking in more general terms, a handling system. Conventional molds may comprise one stationary mold portion and one movable mold portion, however, within so-called stack molds, there are three distinct mold portions, namely, a center platen and two further mold portions located on opposite sides of the center platen. Irrespective of the type of mold the mold portions execute a closing and an opening movement for allowing an injection cycle to take place in the closed state of the mold whereas the injected and finished plastic material articles may be unloaded from the load in its open state.

For unloading finished plastic material articles or for inserting items into the mold cavities prior to injecting plastic material, it is known in the art to use handling systems or robots having a gripper. The gripper enters into the gap between the open mold portions and is retracted therefrom prior to the closing of the mold. In many cases such handling systems are autonomous installations having autonomous control systems which are coupled to the control of the plastic material injection molding machine. However, in some instances the handling system or the gripper is a structural component of the plastic material injection molding machine itself.

For the sake of a simplified description of the invention, the subsequent description starts from the latter assumption without, however, thereby limiting the scope of the invention.

Within the art of plastic material injection molding machines one has the general problem that the gripper must enter between the mold portions in their open state and must be retracted therefrom for unloading a finished article and/or for inserting a specific item into the still empty mold cavity. This means that the trajectories of the movable gripper on the one hand side and the movable mold portion on the other hand side spatially overlap at least partially. As a consequence, the movement or displacement of these components must be precisely synchronized in order to avoid collisions therebetween.

The safest option to achieve this object would be to initiate the movement of one of the components only at a moment in time when the respective other component has left the trajectory of the first movable component. However, this has the disadvantage that the cycle time of the injection molding machine becomes very long due to the necessary delay times. The term "cycle time" is to be understood as the period of time needed by the plastic material injection molding machine for a complete loading, injecting and unloading cycle until the next cycle may be initiated.

U.S. patent specification 5,250,239 mentioned above suggests to initiate the movement of the first component already at a moment in time when the second movable component has not yet entirely left the trajectory of the first component. For that purpose both components are provided with two sensors each, one of which measuring the position and, by determining a period of time, also the velocity of the component at that particular position. The other sensor is connected to a control unit generating an enabling signal for the movement of the first component when the second component has passed the position of its second sensor with a predetermined velocity.

By measuring the period of time needed by the second component for moving through the distance between the two sensors associated to it, one has a guarantee that the enabling signal is generated only when the second component moves with a velocity corresponding to normal operation at a predetermined position. Due to the inertial masses of the components involved one may assume in this case that even when a failure occurs, the second component will at least travel through such a distance that no collision occurs.

Optimizing the cycle time in such a plastic material injection molding machine while concurrently avoiding collisions even in the case of an operational failure highly depends on the position of the second sensor and, accordingly, from the moment in time when the enabling signal is generated. If the second sensor is located such that the enabling signal for the first component is generated too early, a collision due to a failure of the normal operation may not be entirely excluded.

The worst case that may occur insofar would be when the drive for the second component fails at a moment in time in which the enabling signal for the first component is generated. In that case the first component will be started while the second component may not leave the trajectory of the first component with the speed that it would assume under normal operational conditions.

If, on the other hand side, the trigger point for the enabling signal is set too late, the cycle time for the injection molding machine is unnecessarily extended.

U.S. patent specification 5,250,239 is silent about the possibilities or methods for determining and setting an optimum trigger point for generating an enabling signal.

German patent specification 41 10 948 discloses a method for unloading injected plastic material articles from an injection molding machine. According to that method the movement of a first component shall be initiated at the earliest possible moment in time for increasing the cycle frequency and, hence, shorten the cycle time of the injection molding machine. For doing so, the motional sequences of the two components are each compared with a displacement vs. time function stored in the control unit in order to readjust the motional sequence in case of an unallowed deviation from the predetermined motional sequence. An emergency shutdown is also provided. However, in view of the above-mentioned optimization, this prior art only discloses in general terms that a collision shall be avoided by stopping movements in case of an emergency. The specification is silent about how to determine the trigger point for generating the enabling signal in an optimized way.

It is, therefore, an object underlying the present invention to provide a method and an apparatus of the kind specified at the outset, making a plastic material injection molding machine cycle time as short as possible on the one hand side while, on the other hand side, definitely avoiding a collision of the moved components even under worst case assumptions. It is, further, an object of the invention to provide an appropriate plastic material injection molding machine.

SUMMARY OF THE INVENTION

According to the method specified at the outset, this object is achieved by the following sequence of steps:

a) determining a first period of time between a first moment in time when the enabling signal is generated and a second moment in time when the first movable component enters the second trajectory;

b) determining a second period of time between the first moment in time and a third moment in time when the second movable component leaves the first trajectory;

c) comparing the first period of time with the second period of time and generating a difference signal therebetween; and d) controlling motion of the first movable component as a function of the comparison of the first period of time with the second period of time such that the difference signal is smaller than a predetermined minimum tolerance value.

The object is, further, achieved by a plastic material injection molding machine as specified at the outset and comprising:

a) means for determining a first period of time between a first moment in time when the enabling signal is generated and a second moment in time when the first movable component enters the second trajectory;

b) means for determining a second period of time between the first moment in time and a third moment in time when the second movable component leaves the first trajectory;

c) means for comparing the first period of time with the second period of time and generating a difference signal therebetween; and d) means for controlling motion of the first movable component as a function of the comparison of the first period of time with the second period of time such that the difference signal is smaller than a predetermined minimum tolerance value.

The inventor of the present invention has realized that the problems specified at the outset may be perfectly characterized by an appropriate formula involving a time function. He has, further, realized that such a formula very well fits to the fact that the optimization of the cycle time of an injection molding machine is also a problem in a time dimension. By formulating both conditions specified in connection with the object underlying the invention within the same physical dimension, the inventor has made it possible to provide an optimizing rule within one single common relationship. On that basis it is possible to achieve a simple and optimized control of the motional sequence of moved components within a plastic material injection molding machine.

There are various possibilities for controlling the machine, i.e. for influencing the various motional parameters, as will be shown hereinafter. However, it is a common concept that the control is based on a comparison of the two periods of time specified above, followed by an appropriate optimization.

The second period of time must always be smaller than the first period of time by a predetermined difference, referred to as a tolerance value. The tolerance value on the one hand side indicates how much reserve time is available between the movements of the two components even in the case of a malfunction. On the other hand side the tolerance value is indicative about how much additional delay time is comprised within the cycle time. The closer the tolerance value is to zero, the better is the method with respect to the optimization of the cycle time.

The comparison between these two periods of time may be effected, for example, by interrelating same in an appropriate control unit of the inventive plastic material injection molding machine, utilizing an appropriate software. As an alternative, the comparison may be effected by determining the difference between the two periods of time by means of appropriate sensors on a hardware basis and by only then evaluating the difference with respect to its value and its polarity. Moreover, any other conceivable means for determining and evaluating a difference in time may be used in the scope of the present invention. It depends on the structural characteristics of the particular plastic material injection molding machine which one of these possible alternatives is selected as being advantageous in a particular situation.

According to a first alternative, the two periods of time to be compared with each other are determined only once when the machine is switched on for operation. However, as a second alternative, the comparison may be repeated during the operation of the machine.

It should be mentioned at this instance that the term "period of time" shall be understood to comprise any quantity being adapted to be indicative for time. It is, therefore, not necessary to actually determine the period of time with the usual time units like seconds or fractions of seconds. Instead, time may also, for example, be represented by a dimension-less number of subsequent equal or unequal pulses.

It is an advantage of the method according to the invention that a collision between the components is avoided even if an operational failure occurs at the worst possible moment, while simultaneously the cycle time of the machine is set as short as possible while taking these conditions into account. Moreover, the method has the advantage that it may be installed without substantial structural modifications on an injection molding machine. Therefore, substantial advantages may be achieved while making only minor investments necessary.

A further advantage of the invention consists in that the trigger point for generating the enabling signal may be set quickly and exactly. The trigger point may further be set automatically.

The object underlying the invention is thus entirely solved by the inventive method and the inventive plastic material injection molding machine.

According to a preferred embodiment of the invention one of the movable components is a first mold portion executing an opening movement and a closing movement, respectively, relative to a second mold portion, and the other one of the movable components is a gripper being adapted to be moved into and out of, respectively, a gap between the mold portions.

This measure has the advantage that the inventive method may be applied to the two components being essential for the function of a plastic material injection molding machine. Therefore, all of the afore-mentioned advantages of the inventive method may be fully utilized. However, the method is generally also applicable for other movable components of a plastic material injection molding machine the trajectories of which spatially over-lap at least partially.

In a further embodiment of the invention at least one of the periods of time is measured by means of a sensor.

This measure has the advantage that within the one period of time also variations within the motional sequence of the corresponding component are taken into account, for example variations due to changes in temperature or aging processes.

According to another embodiment of the invention another one of the periods of time is stored as a parameter in a control unit of the plastic material injection molding machine.

This measure has the advantage that the amount of hardware used and, hence, the costs of an inventive plastic material injection molding machine are reduced. The measure mentioned before is possible due to the fact that not all parameters within the motional sequences of a plastic material injection molding machine change so essentially or quickly that a repeated, actual measurement by means of a sensor would be necessary.

In another modification of the above-mentioned measures at least one of the periods of time is indicative for a motion of the gripper.

This measure is based on the fact that the gripper of a plastic material injection molding machine is mostly lighter as compared to the movable mold portion or portions, respectively. As a consequence, the dynamic behavior of a gripper may be controlled easier, simpler and faster. However, the movements of a gripper are subject to faster and larger changes during the operation of the machine. It is, therefore, a further advantage of this measure to use that period of time that is subjected to stronger and more short term variations by picking up operational parameters.

In another embodiment of the invention the period of time is indicative for a motion of the mold portion.

Seen as a whole, the features mentioned before have the advantages that the costs for a plastic material injection molding machine and for the inventive method are minimized, while concurrently effecting an optimized control of the operational sequences. The features mentioned above are, further, of particular advantage in a situation where the gripper is not a structural component of the inventive plastic material injection molding machine but is a component within a separate handling system or robot instead that must be adapted to such a machine. In that situation the amount of structural changes is minimized because the control of the injection molding machine itself may basically remain as it is and needs only minor changes.

In another embodiment of the invention at least one of the periods of time is set depending on a change in acceleration, a displacement and/or a delay time of at least one of the movable components.

This measure has the advantage that by setting one of these parameters the motional sequences of the moved components may be harmonized simply and efficiently. This measure is of particular advantage when the period of time and, hence, the motional sequence of the gripper within a plastic material injection molding machine is set via a modification of these quantities because the gripper yields a higher flexibility due to its lower weight as compared to the mold.

In another embodiment of the invention the enabling signal is generated when the second movable component has reached a predetermined trigger position, the trigger position being set as a function of the first and the second period of time.

This measure has the advantage to make a particularly simple control possible resulting in modifications within the motional sequences of the movable components by simply modifying the control software. For example, the trigger position for generating the enabling signal is iteratively shifted in the direction of an earlier triggering, depending on the comparison of the two periods of time, for setting the difference between the periods of time to a desired value. The earlier the enabling signal for the first movable component is generated within the motional sequence of the second movable component, the earlier the first movable component reaches the trajectory of the second movable component.

In a further embodiment of the invention, the second period of time is determined by way of a simulation simulating a failure of a drive associated with the second movable component occurring at the first moment in time.

This measure has the advantage that the second period of time is determined by measuring for the event of a malfunction, corresponding to the worst possible case. Accordingly, all individual machine tolerances are taken into account for determining the second period of time. A collision of the two movable components is thus definitely avoided under any conceivable circumstances. On the other hand side, the second period of time may thus be determined very simply for a worst case situation.

According to another embodiment of the invention, an error signal is generated on a failure of a drive associated with the second movable component, and motion of the first movable component is stopped or suppressed upon generation of the error signal.

This measure has the advantage that by doing so, the first period of time is extended for the relevant case of a failure within the drive of the second movable component or it is even avoided that the first movable component starts to move. The latter case, however, is only possible if the error signal is available so early that the movement of the first movable component may effectively be suppressed even in view of delays associated with signal transmission and switching. If the error signal is available only at a moment in time when the first movable component has already received its enabling signal, the movement thereof may be normally no more be suppressed due to the delay times associated with the transmission of the signals and switching operations. However, if in such a situation, the movement of the first movable component is delayed, the period of time is extended until it reaches the trajectory of the second movable component. By taking into account the corresponding gain in time, the cycle time of the plastic material injection molding machine may be reduced within an undisturbed operation and no collision may occur even in the case of a drive failure.

In a further embodiment of the invention, an error signal is generated as soon as a motional sequence of the second movable component is outside a pre-determined tolerance band and motion of the first movable component is stopped or suppressed upon generation of the error signal.

This measure has the same advantages as the measures explained above. It is of particular advantage in combination with the afore-mentioned measure because failures in the motional sequence of the second movable component may also be taken into account which do not result from a drive failure.

In still another embodiment of the invention, the tolerance band is determined empirically by executing the motional sequence several times under production conditions prior to productively operating the injection molding machine.

This measure has the advantage that the tolerance band may be adapted to changes in the actual motional sequences of the moved components. By doing so it is possible to make the widths of the tolerance band as small as possible so that malfunctions in the operational sequence of the second moved component may be detected much earlier.

According to a modification of the afore-mentioned measure, the tolerance band is measured under production conditions in predetermined time intervals and is adjusted accordingly.

This measure has the advantage that the tolerance band may also be adapted to changes of the motional sequences within the operation of the plastic material injection molding machine. By doing so, the widths of the tolerance band may still further be narrowed thus making it possible to even earlier detect malfunctions.

In another embodiment of the inventive method, the at least one period of time is determined repeatedly during the carrying out of the method.

This measure also has the advantage that changes of the motional sequences of the moved components, for example due to changes in temperature, are also taken into account at any time.

In another embodiment of the inventive method, the supply voltage for a drive associated with the second movable component is buffered such that a drive for the second movable component may be maintained even upon failure of the supply voltage until the second movable component has left the first trajectory.

This measure has the advantage that the second period of time may be shortened because the movement of the second movable component may be maintained over a certain period of time even in the event of a complete failure of the supply voltage. This period of time is normally of the order of 300 ms. The reduction of the second period of time enables to set the first period of time smaller, thereby also shortening the cycle time of the plastic material injection molding machine as a whole. The buffering of the supply voltage is advantageously effected by increasing the capacity and the so-called intermediate circuit, i.e. a rectifier circuit for smoothing an alternating line voltage.

The complete failure of the supply voltage for the drive of a movable component is one of the most frequent malfunctions in common plastic material injection molding machines. A reason for this malfunction may, for example, be electromagnetic interference in the vicinity of the injection molding machine.

In a further embodiment of the invention, the first movable component is braked down at maximum deceleration rate upon a malfunction within the motional sequence of the second movable component.

This measure is particularly important because movable components are normally slowed down or decelerated in a controlled manner. This control would, therefore, have to be switched off or overruled in an emergency situation. The suggested measure has the advantage that the first period of time is thereby dynamically shortened in the case of an operational malfunction. By doing so, it is possible to make the first period of time shorter under undisturbed operational conditions, thereby shortening the cycle time of the machine. By dynamically increasing the first period of time in a malfunction situation, it is, concurrently, guaranteed that a collision between moved components is avoided.

According to a modification of this embodiment, the first movable component is braked with a first brake means under normal operational conditions and is braked down with a second brake means at an increased deceleration rate in case of a malfunction.

For braking down, one may directly influence the drive. According to a first alternate solution, it is, however, also possible to provide an external brake, for example a shoe-brake. According to another alternative, a bumper may be also be used which converts kinetic energy into deformation. Such bumpers are, for example, configured as coaxial impact shock absorbers (dash pots) as used in steering shafts of motor vehicles and which are, hence, available as low-cost standard components from the automotive industry.

This measure has the advantage that a higher maximum braking force may be applied, as would be necessary during undisturbed operation of the injection molding machine. The first period of time is dynamically increased by the increased braking force in the event of a malfunction, as outlined above. In another preferred modification of this measure, the deceleration control of the first movable component is switched off in order to avoid a counter action of that control against generation of a maximum brake force. By doing so, it is ensured that the first period of time is extended to a maximum possible extent in the case of a malfunction. The gain of safety reserve in time units that may so be obtained is preferably taken into account for reducing the cycle time under undisturbed operational conditions of the injection molding machine.

In another embodiment of the inventive method, the first movable component is first accelerated at a lower rate of acceleration upon receipt of the enabling signal, and is then accelerated at a maximum rate of acceleration upon passing a last possible collision-free stop point at least until entering into the second trajectory.

When doing so, the critical spatial range in which the first movable component may no more be stopped in good time for avoiding a collision, is shortened as much as possible. As long as the first movable component has not yet passed the last possible collision-free stop point, it may be stopped upon occurrence of a malfunction within the motional sequence of the second movable component before entering into the trajectory of the latter. Thereby, a collision is definitely avoided independently of the position of the second movable component.

Having passed the last possible collision-free stop point, the first movable component may no more be stopped prior to entering into the trajectory of the second movable component. Therefore, the worst conceivable case with a respect to the occurrence of a failure or malfunction within the second movable component drive is that moment in time when the first movable component passes the last possible collision-free stop point. If a malfunction occurs prior to that moment in time, the first movable component is stopped in good time as a reaction to an emergency stop signal generated in that situation. However, if the malfunction occurs at a later moment in time, the second movable component has to a larger extent moved away from the trajectory of the first movable component. The afore-mentioned measure has the advantage that the period of time between the generation of the enabling signal and the passing of the last possible collision-free stop point is extended as much as possible whereas the period of time after having passed the last possible stop point is shortened as much as possible. The shortened critical period of time enables to also shorten the cycle time of the injection molding machine under undisturbed operational conditions. In a further embodiment of this feature, the period of time after the passing of the last possible collision-free stop point is used for controlling the motional sequences.

In a further embodiment of the invention, the trajectory of one of the movable components is directed essentially vertically, the one movable component entering the trajectory of the other movable component from above and the one movable component is secured from falling down by a stop means in case of a malfunction.

This measure has particular importance when the component being displaced in a vertical direction looses its fixation with respect to a stationary support because the supply voltage is entirely off. The suggested feature has, therefore, the advantage that even under these conditions a collision of the two movable components is definitely avoided.

Finally, a common control unit may be used that is provided for the first and the second movable component, the motional sequences of the movable components being compared within the control unit and a malfunction signal is generated in case of a malfunction.

This measure has the advantage that due to synchronizing the motional sequences as a consequence of the comparison an immediate trouble shooting is possible in case of a malfunction of failure, for example by triggering an emergency brake or an entire shut-down. The delay times for doing so are thus minimized.

It goes without saying that the features that have been explained hereabove and those that will be explained hereinafter may not only be used in the particular given combination but also in other combinations or alone without leaving the scope of the present invention.

BRIEF DESCRIPTION OF THE DRAWINGS

Embodiments of the invention are depicted in the drawing and will be discussed in more detail here and after.

DETAILED DESCRIPTION OF THE PREFERRED EMBODIMENTS

Figure 1:
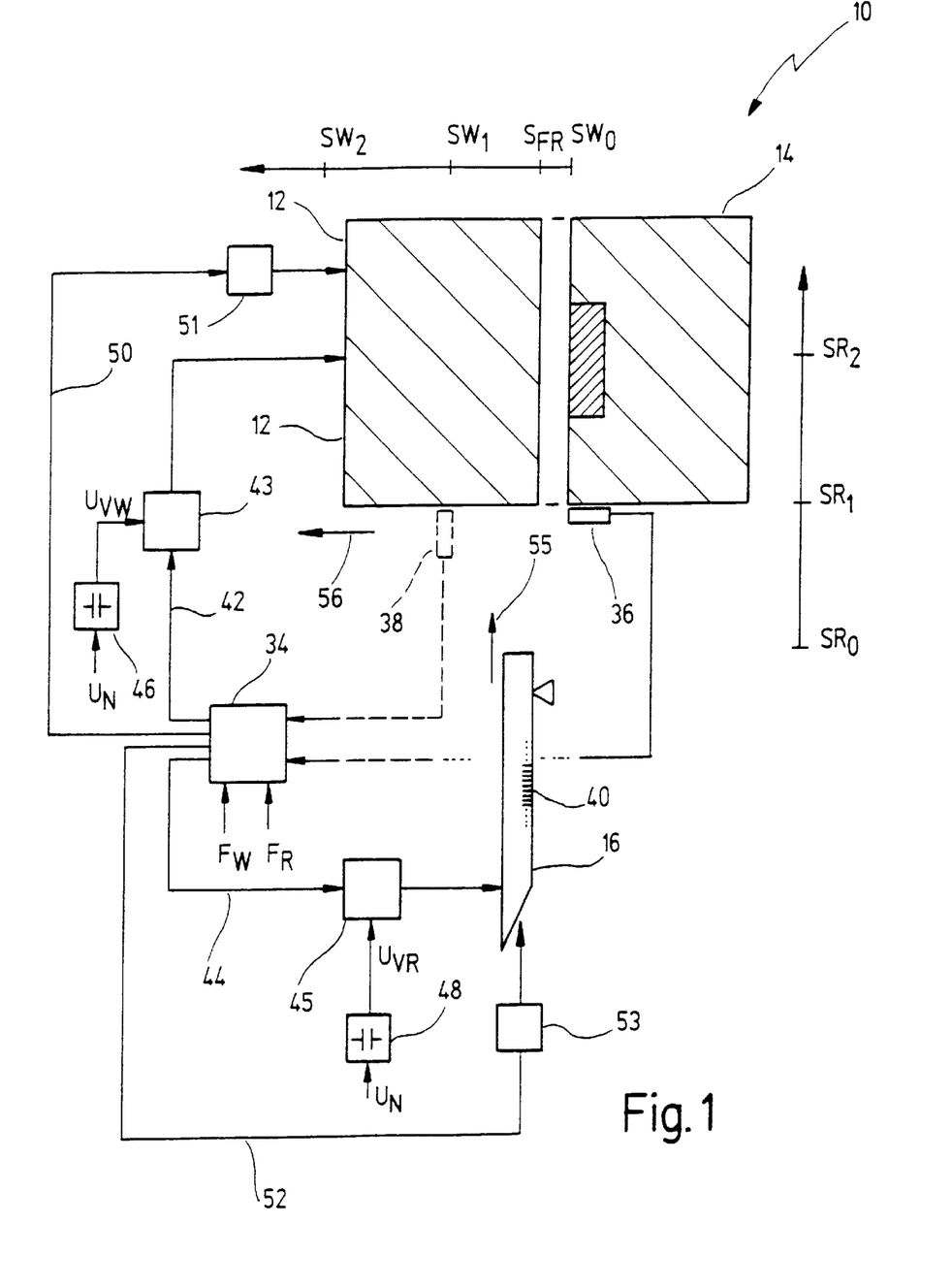
FIG. 1 shows a schematic depiction of an inventive plastic material injection molding machine with a mold portion being at the beginning of its opening movement and a gripper being at the beginning of its entering movement.
Figure 2:
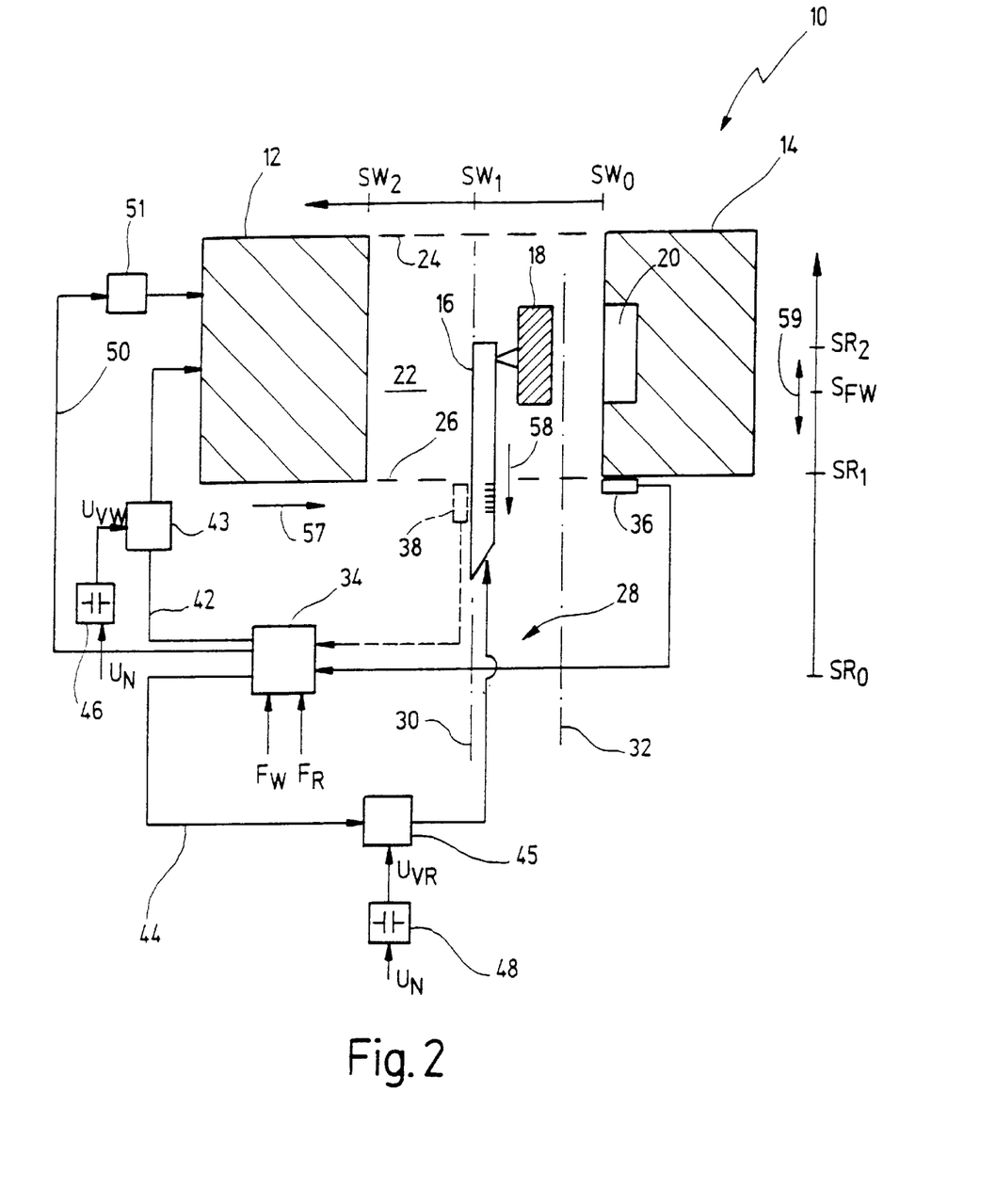
FIG. 2 shows the plastic material injection molding machine of FIG. 1 with a mold portion being at the beginning of its closing movement and with a gripper being at the beginning of its exiting movement.

In FIG. 1 and FIG. 2, an embodiment of a plastic material injection molding machine according to the present invention is, as a whole, designated by reference numeral 10.

Plastic material injection molding machine 10 comprises a first movable component, consisting of a movable mold portion 12 and a stationary mold portion 14. This embodiment has been selected for the sake of simplicity of illustration and explanation and does not exclude other embodiments having a plurality of movable mold portions, as is, for example, the case in so-called stack molds.

Reference numeral 16 designates a second movable component, i.e. a gripper. Gripper 16, as shown in FIG. 2, may enter into an area between mold portions 12 and 14 for unloading a work piece 18 from a cavity 20 within mold portion 14.

Reference numeral 22 in FIG. 2 designates a trajectory of movable mold portion 12, being delimited by lines 24 and 26. Trajectory 22 of mold portion 12 is partially overlapped by a trajectory 28 of gripper 16, delimited in FIG. 2 by lines 30 and 32. The term "trajectory" is to be understood to designate the entire spatial volume through which a movable component is advanced during a motional sequence and where, hence, collisions might occur with other movable or stationary components.

Reference numeral 34 designates a control unit. Signals of a sensor 36 and of another sensor 38 may be fed to control unit 34. Sensor 38 constitutes a possible option and is not mandatory, as indicated by dash lines. Sensor 36 is located at a position $SR_1$ corresponding to the position of gripper 16 when entering or leaving, respectively, trajectory 22 of mold portion 12. Optional sensor 38 is located at a position $SW_1$ corresponding to the position where mold portion 12 enters or leaves, respectively, trajectory 28 of gripper 16. In the present case, sensor 36 is adapted to detect and read a scale or marking 40 applied to gripper 16. Control unit 34 is adapted to determine the actual position of gripper 16 and its velocity therefrom. Sensor 38 is likewise configured.

Starting from control unit 34, a control signal 42 is fed to a drive unit 43 of movable mold portion 12 and a control signal 44 is fed to a drive unit 45 of gripper 16. By means of drive units 43 and 45, mold portion 12 and gripper 16 are accelerated and decelerated, respectively. Accordingly, control signal 42 and 44 comprise enabling signals for enabling movement of the respective components and, further, comprise emergency stop signals.

Drive unit 43 and 45 require a supply voltage which, in the case of drive unit 43 is designated by $U_{VW}$ and, in the case of drive unit 45 is designated with $U_{VR}$. In common plastic material injection molding machines, supply voltages $U_{VW}$ and $U_{VR}$ are normally direct voltages having been generated by rectifying an alternating line voltage $U_N$. This is normally effected within a so-called intermediate circuit.

In plastic material injection molding machine 10, the intermediate circuits comprise additional buffer means 46 and 48 of increased capacity. Buffer means 46 and 48 serve for buffering supply voltages $U_{VW}$ and $U_{VR}$, respectively. As a consequence, in the event of a complete failure of the supply voltage, the movement of the respective components may be maintained for a certain period of time within which the components continue to move ahead. In the particular plastic material injection molding machine shown, this period of time is of the order of 300 ms.

Starting from control unit 34, another control signal 50 is fed to an additional brake means 51 and, further, still another control signal 52 is fed to an additional brake means 53. Additional brake means 51 acts on mold portion 12 and is intended to brake same down at maximum rate of deceleration upon occurrence of a malfunction in the motional sequence of gripper 16. Vice versa, additional brake means 53 acts on gripper 16 and brakes same down at maximum deceleration rate in case of a malfunction within the motional sequence of a movable mold portion 12. Additional brake means 51 and 53 are used within plastic material injection molding machine 10 in addition to the normal braking action of the respective driving units 43 and 45 for achieving the maximum possible deceleration. Additional control signal 52 and additional brake means 53 are only shown in FIG. 1 for the sake of simplicity.

For explaining the motional sequences hereinafter, two coordinate axes SR and SW are shown, the positions of which corresponding to those within the displacement vs. time diagrams of FIGS. 3 and 4.

In the situation as shown in FIG. 1, gripper 16 starts its movement along an arrow 55. An enabling signal 44, required for doing so, is generated at that moment in time when mold portion 12 has passed trigger position $S_{FR}$ in the direction of an arrow 56. FIG. 2 shows the inverse case where mold portion 12 starts its movement in the direction of an arrow 57 as soon as it receives an enabling signal 42. Enabling signal 42 is generated as soon as gripper 16 has passed trigger position $S_{FW}$ in the direction of an arrow 58.

An arrow 59 indicates that trigger position $S_{FW}$ may be varied within control unit 34 on a software level, making it possible to modify the trigger point for the generation of enabling signal 42.

The motional sequence of mold portion 12 is entirely stored as a parameter within control unit 34. The control of the motional sequence of gripper 16 is effected as a function of the parameter data by modifying the acceleration of trigger point $S_{FW}$ and/or the delay time of gripper 16.

Additionally, control unit 34 receives error signals $F_W$ and $F_R$ from monitoring circuits (not shown). Error signals $F_W$ and $F_R$ are generated when a failure or malfunction is detected within the motional sequence of the respective component 12 and/or 16. One possible source for the generation of error signals are voltage monitoring circuits, monitoring supply voltages $U_{VW}$ and $U_{VR}$.

Figure 3:
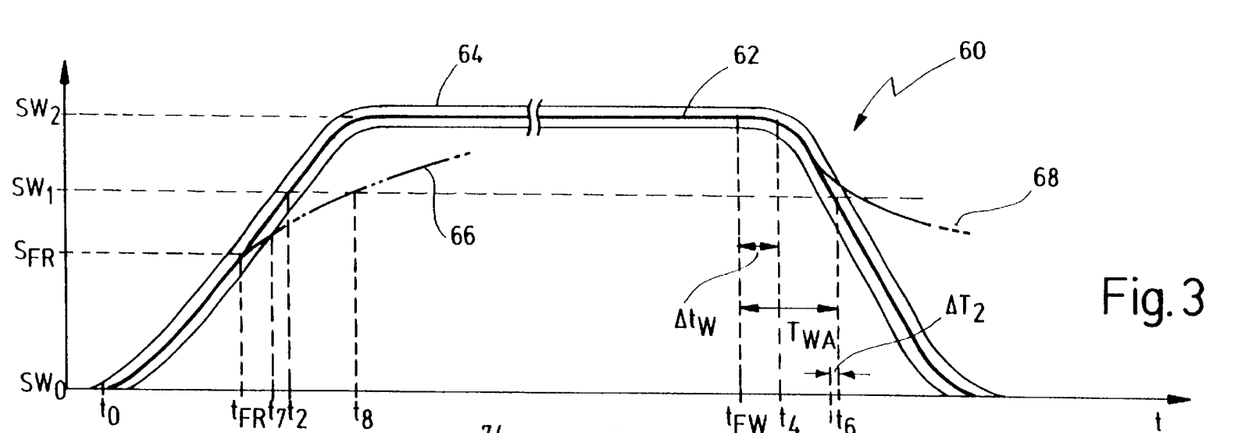
FIG. 3 shows a displacement vs. time diagram depicting the motional sequence of the mold portion of FIG. 1.

In FIG. 3, a displacement vs. time diagram for the motional sequence of movable mold portion 12 is designated in its entirety by reference numeral 60. Starting from position $SW_0$, graph 62 first rises monotonously up to position $SW_2$. This first portion of curve 62 describes the opening movement of mold portion 12. From then on, curve 62 extends constantly and horizontally from position $SW_2$ on until it again falls down monotonously back to position $SW_0$. This falling down portion of curve 62 describes the closing movement of mold portion 12.

Reference numeral 64 designates a tolerance band within which curve 62 runs during an undisturbed operation of mold 12. If tolerance band 64 is trespassed, this means that there is a malfunction or failure within the motional sequence of mold portion 12. Such a case is indicated by curve 66.

Curve 68 corresponds to a motional sequence within which movable mold portion 12 receives an emergency stop signal due to a malfunction within the drive of gripper 16 and is braked down accordingly.

Figure 4:
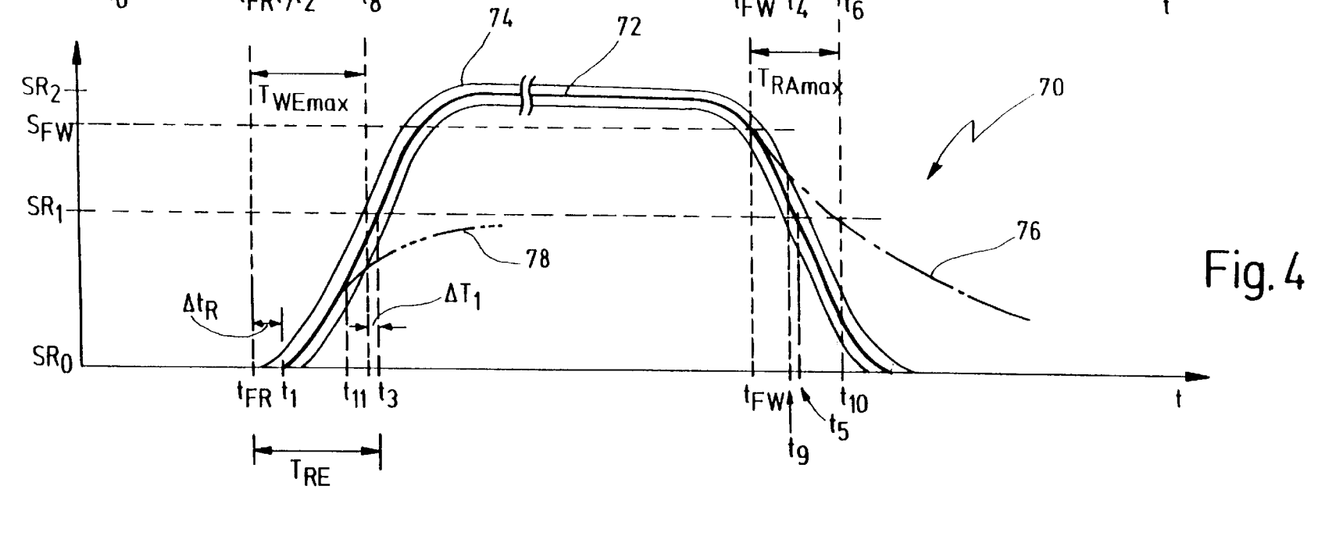
FIG. 4 shows a displacement vs. time diagram depicting the motional sequence of the gripper of FIG. 1.

In FIG. 4, a displacement vs. time diagram for describing the motional sequence of gripper 16 is designated in its entirety by reference numeral 70. Curve 72 from a position $SR_0$ on first rises monotonously up to a position $SR_2$. This first portion of curve 72 describes the entering movement of gripper 16 between mold portions 12 and 14. From that position on curve 62 extends constantly and horizontally from position $SR_2$ on and then falls down monotonously again back to position $SR_0$. The falling down portion of curve 72 describes the exciting movement of gripper 16 from the area between mold portions 14. Reference numeral 74 designates a tolerance band within width curve 72 runs during undisturbed operation of gripper 16. Trespassing tolerance band 74, as indicated by curve 76, again indicates a malfunction within the motional sequence. Curve 78, again, shows the case where gripper 16 was braked down or stopped due to an emergency stop signal.

Let us now consider an undisturbed motional sequence of mold portion 12 and gripper 16 making reference to displacement vs. time diagrams 60 and 70.

The motional sequence starts at $F_0$ when mold portion 12 starts its movement in the direction of arrow 56. At the moment in time when mold portion 12 has reached position $S_{FR}$, enabling signal 44 for gripper 16 is generated. For doing so, control unit 44 takes into account various other values and parameters, for example the presence of error signal $F_W$ and, in some cases, the velocity of mold portion 12 at $F_R$. Reaching position $S_{FR}$ is detected either by means of sensor 38 or is derived from the stored motional sequence of mold portion 12. Due to the generation of enabling signal 44, gripper 16 starts its movement in the direction of arrow 55, however, a delay time $\Delta t_R$ due to propagation times of signals and switching times has been taken into account.

At $t_2$ mold portion 12 reaches position $SW_1$ when it leaves the trajectory 28 of gripper 16. At that moment in time gripper 16 is still before position $SR_1$.

Gripper 16 passes position $SR_1$ at $t_3$ and, hence, enters into trajectory 22 of mold portion 12. $t_3$ is after $t_2$. Accordingly, there is no collision between mold portion 12 and gripper 16.

During further movement mold portion 12 moves into its end position $SW_2$ and gripper 16 moves into its gripper position $SR_2$.

At that position gripper 16 picks up a finished workpiece 16 and starts its exiting movement.

At $t_{FW}$ gripper 16 passes trigger position $S_{FW}$ which is detected by means of sensor 26. Accordingly, control unit 34 generates enabling signal 42 for mold portion 12, while taking into account further parameters and values, for example the presence of an error signal $F_R$ in the velocity of gripper 16 at that position. Mold portion 12 starts moving accordingly, however, only after a certain internal delay time $\Delta t_W$ of the system has lapsed which, again, is caused due to propagation times of signals and switching delays. Mold portion 12 starts moving at $t_4$. At $t_5$ gripper 16 passes position $SR_1$ and leaves trajectory 22 of mold portion 12. Mold portion 12, in turn, passes position $SW_1$ at $t_6$ and, hence, enters into trajectory 28 of gripper 16. As $t_6$ is after $t_5$, a collision does neither happen in this situation.

However, the motional sequences of the two components are critical when a malfunction or failure occurs. A worst case situation is to be assumed when the respective enabling signal is generated at essential the same moment in time when the drive unit for the respective other component fails that should get out of the way. For, in that case the enabling signal is generated on the one hand side and, on the other hand side, the component with the disturbed drive unit has to make a maximum travel distance. Such a case for the entering movement of gripper 16 into the area between mold portions 12 and 14 is shown with curve 66 branching off curve 62 at $t_{FR}$ with a smaller inclination. The smaller inclination of curve 66 corresponds to a lower velocity of mold portion 12 which, upon failure of its associated drive, only continuous movement due to inertial forces.

If the drive failure has not yet been detected due to an error signal $F_W$, such failure may be detected by control unit 34 with the help of sensor 38 at $t_7$ when curve 66 trespasses tolerance band 64. At that moment in time, however, gripper 16 has already started moving due to the generation of enabling signal 44. At $t_8$ mold portion 12 reaches position $SW_1$ due to inertial forces where it leaves trajectory 28 of gripper 16.

According to the present invention the control of gripper 16 is made such that $t_8$ is earlier than $t_3$ by a tolerance value $\Delta t_1$. $t_3$ is the moment in time where gripper 16 enters into trajectory 22 of mold portion 12. By doing so a collision between mold portion 12 and gripper 16 is definitely avoided even in such an unfortunate situation where the drive for mold portion 12 fails.

A comparable situation is shown in curves 62 and 72 during the exiting movement of gripper 16. Curve 76 indicates a malfunction within the drive of gripper 16 at $t_{FW}$. Curve 76 has a smaller inclination which, again, is due to its lower velocity. At $t_9$ curve 76 trespasses tolerance band 74 which may be detected by control unit 34 with the help of detector 36. As gripper 16 even in this situation passes position $SR_1$ at $t_{10}$ due to inertial forces, a collision is avoided provided that $t_{10}$ is earlier than $t_6$ by a tolerance value $\Delta t_2$. $t_6$ is the moment in time when mold portion 12 passes position $SW_1$ and, hence, enters into trajectory 28 of gripper 16.

As shown by means of curves 68 and 78, tolerance values $\Delta t_1$ and $\Delta t_2$ are increased in a situation where the respective controlled component is braked down and, hence, decelerated after the detection of a malfunction. In the case of curve 78 it is even assumed that gripper 16 is strongly decelerated such that it does no more reach position $SR_1$ and, hence, does no more enter into trajectory 22 of mold portion 12. The gain in time due to an emergency stop and the associated deceleration may be used for the control of the components for reducing tolerance value $\Delta t_1$ and $\Delta t_2$, which, again improves the cycle time of the machine under normal operational conditions.

For carrying out the inventive method, at least one of the following periods of time are determined:

$$T_{WEmax}=t_8-t_{FR}$$

or $$T_{RE}=t_3-t_{FR}$$

or, respectively, $$T_{RAmax}=t_{10}-t_{FW}$$

or $$T_{WA}=t_6-t_{FW}.$$

The respective other non-determined period of time is preferably stored as a parameter in a memory of control unit 34. It is particularly preferred to use periods of time being indicative for the motional sequence of mold portion 12. By comparing periods of time $T_{RE}$ and $T_{WEmax}$ or $T_{RAmax}$ and $T_{WA}$, respectively, the optimum setting of motional sequences may be checked.

It is preferred to use a common control unit 34 for both movable components 12 and 16. The motional sequences of both components 12 and 16 are directly compared within control unit 34 and, in the event of a malfunction, a malfunction signal is generated. Then, mold portion 12 and gripper 16 are controlled synchronously, and, as soon as an error occurs, it may be transferred immediately, i.e. with minimum delays, into a malfunction signal. By doing so, curves 66 and 78 are directly compared with each other and curve 78 is controlled to directly follow curve 66. The difference in time between $t_7$ and $t_{11}$ is thus minimized.

It should be mentioned at this instance that in the event of an emergency brake operation, for example with respect to gripper 16, an external brake, for example a friction brake, may also be used for braking down at maximum rate of deceleration. As an alternative, a bumper, i.e. an impact shock absorber may also be used for transforming the inertial energy of the gripper into deformation energy in case of a collision in order to avoid damages in such situation. The impact shock absorber may be a standard component, e.g. a dash pot, which is, for example, used as a safety device within steering shafts of motor vehicles.

Figure 5:
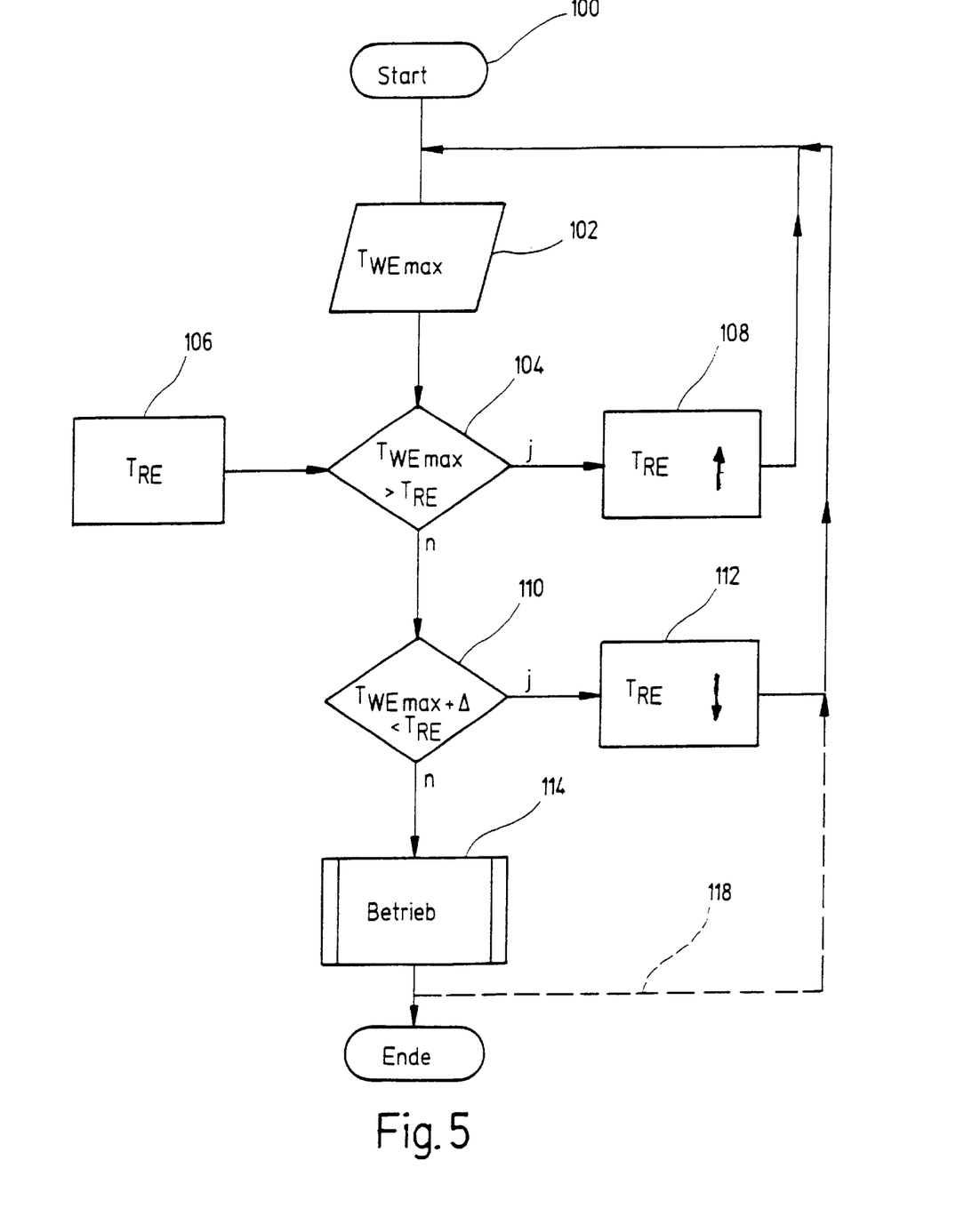
FIG. 5 shows a flow-chart for explaining the inventive method during the entering movement of the gripper into the trajectory of the mold portion.

The flow chart of FIG. 5 shows the inventive method with respect to the entering movement of a gripper 16 into the area between mold portions 12 and 14. Following start step 100 the period of time $T_{WEmax}$ is determined in step 102. For that purpose during the setting up of the machine mold portion 12 is at least once displaced along arrow 56. At the moment in time when mold portion 12 passes position $S_{FR}$, the associated drive is switched off. This may be made by simply actuating an emergency switch. Concurrently, the amount of time is determined until mold portion 12 reaches position $SW_1$. In step 104 period of time $T_{WEmax}$ is compared with period of time $T_{RE}$ which, according to step 106, is stored within control unit 34 either as a parameter having resulted from theoretical considerations or as a measured value. In the event that period of time $T_{WEmax}$ is longer than period of time $T_{RE}$, measures have to be taken according to step 108 for increasing period of time $T_{RE}$. This may be done, for example, by displacing trigger position $S_{FR}$ towards end position $SW_2$ or, as an alternative, by making delay time $\Delta t_R$ or the travel path of gripper 16 longer.

As soon as period of time $T_{RE}$ has become longer than period of time $T_{WEmax}$ due to these measures, steps 110 and 112 follow to set period of time $T_{RE}$ such that the latter is only by a predetermined tolerance value $\Delta t_1$ longer than period of time $T_{WEmax}$. The smaller tolerance value $\Delta t_1$ is, the shorter is the cycle time of the plastic material injection molding machine.

According to step 114 the normal operation of the plastic material injection molding machine follows after this setting of the motional sequences. According to step 118 the afore-described setting of the motional sequences may optionally be repeated several times during the operation of the machine.

Figure 6:
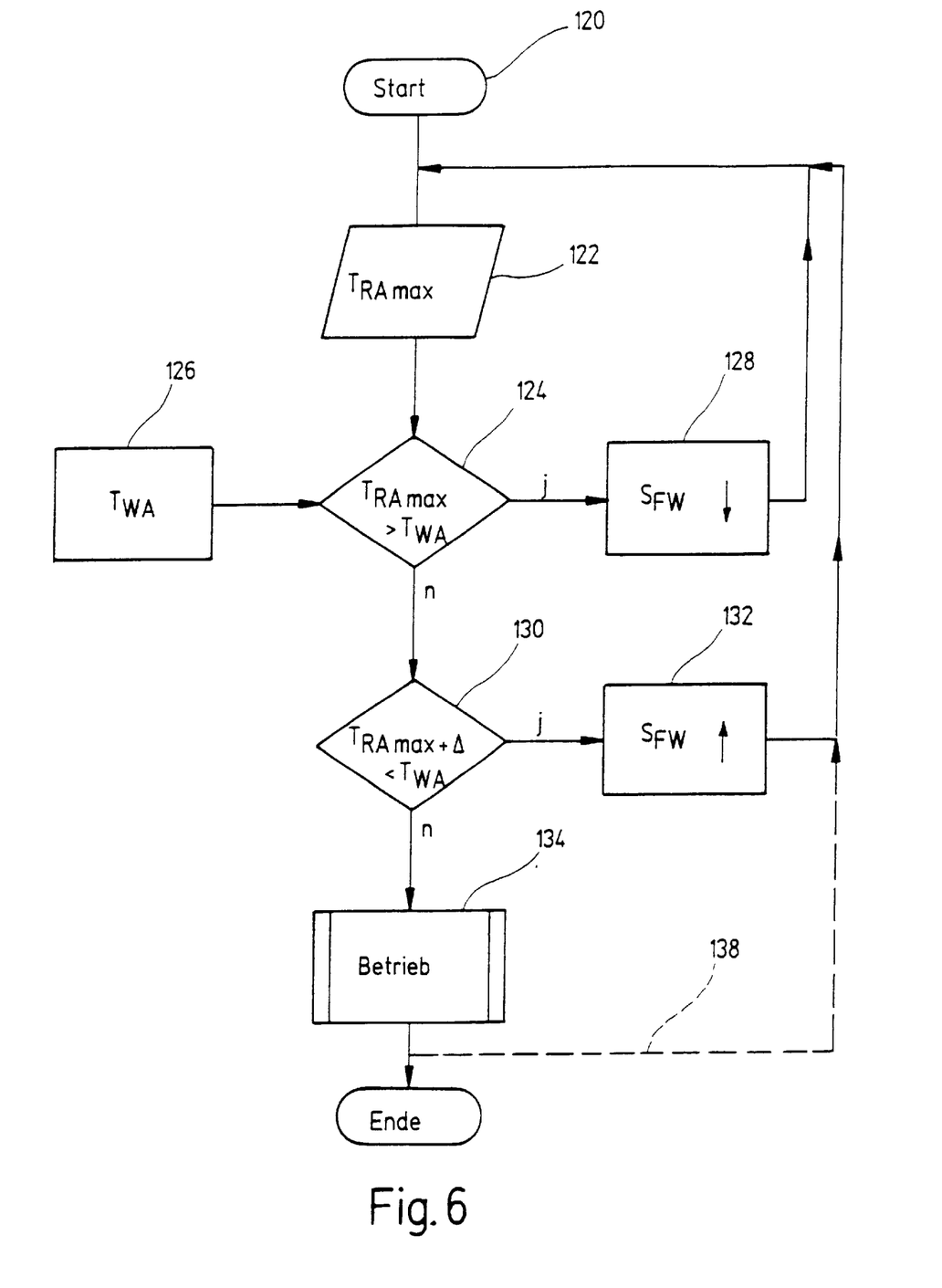
FIG. 6 shows a flow-chart for explaining the inventive method during the exiting movement of the gripper out of the trajectory of the mold portion.

The flow chart of FIG. 6 describes the analogue procedure for a situation where gripper 16 exits from the area between mold portions 12 and 14.

After a start step 120 period of time $T_{RAmax}$ is determined within step 122 in a similar way as described above. Within steps 124 and 126 the afore-determined periods of time $T_{RAmax}$ and $T_{WA}$ are compared. Period of time $T_{WA}$ may again have been determined according to theoretical calculations or may have been measured. According to step 128 trigger position $S_{FW}$ is now shifted towards terminal end position $SR_0$ if period of time $T_{RAmax}$ is longer than period of time $T_{WA}$. As in the preceding case, however, also other parameters of the motional sequence may be modified.

Within steps 130 and 132 the period of time $T_{WA}$ is then set by shifting trigger position $S_{FW}$ such that the latter is only longer by a tolerance value $\Delta t_2$ as compared to period of time $T_{RAmax}$. According to step 134 the normal operation of the plastic material injection molding machine follows which, again, may be optionally combined according to step 138 with a continuing monitoring of the settings during the operational of the machine.

As becomes apparent by way of the description above, the inventive method may likewise be used for controlling gripper 16 or movable mold portion 12. Within normal plastic material injection molding machines, however, gripper 16 has a lower mass as compared to movable mold portion 12. As a consequence, gripper 16 may be controlled faster and more flexible. Moreover, one often has the situation that gripper 16 is a component of a separate and autonomous handling or robotic system that has to be adapted to a predetermined motional sequence of a movable mold portion. Therefore, in such a situation the control may not or practically not influence the periods of time which are indicative for the motional sequence of mold portion 12. Considering, however, that the relationship $$T_{RE} > T_{WEmax}$$

must always be fulfilled for avoiding collisions, the optimization of the cycle time may only be effected by an appropriate control of gripper 16.

Figure 7:
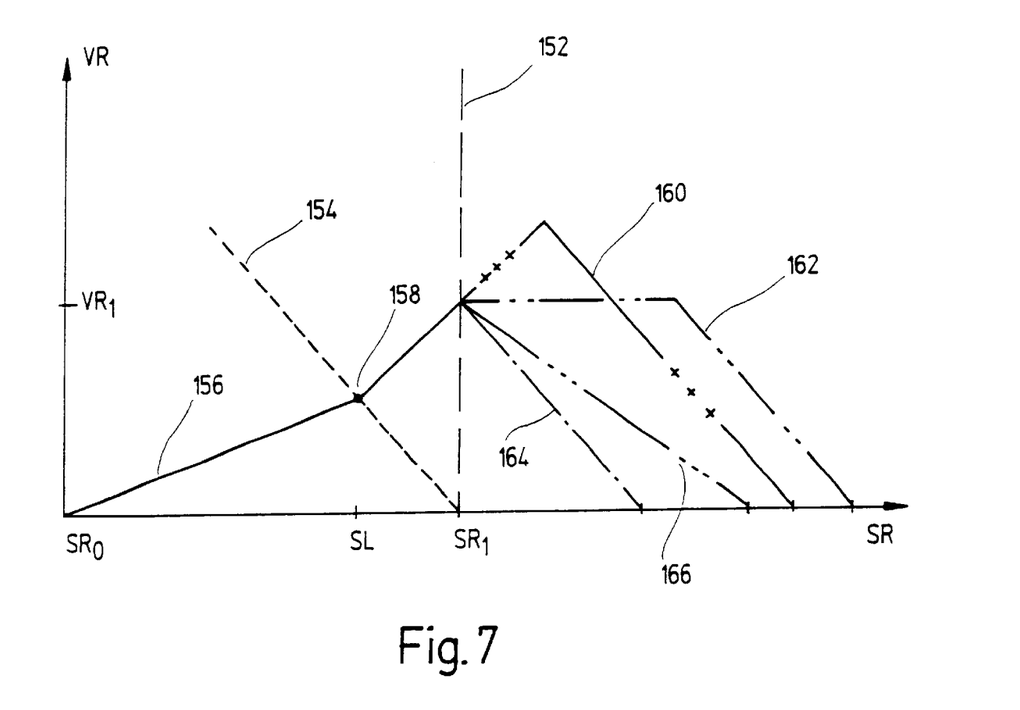
FIG. 7 shows the development of gripper velocity prior to and after the entering into the trajectory of the mold portion.

FIG. 7, accordingly, shows a velocity diagram of gripper 16 during its entering movement between mold portions 12 and 14. For orientation purposes straight line 152 indicates position $SR_1$ where gripper 16 enters into the area between mold portions 12 and 14. Reference numeral 154 indicates an auxiliary straight line having a negative slope being a measure for the maximum possible deceleration of gripper 16. The velocity curve of gripper 16 prior to entering into trajectory 22 of mold portion 12 is designated by 156. Curve 156 intersects straight line 154 at point 158 corresponding to position SL on the abscissa. This position is the last possible collision-free stop position for gripper 16 being independent of the position and movement of mold portion 12. When position SL is passed, a collision between gripper 16 and mold portion 12 may only be avoided by coordinating their respective motional sequences.

The worst case during the entering movement of gripper 16 between mold portions 12 and 14 is the situation when the drive unit for the opening mold portion 12 fails at the moment in time when gripper 16 has passed the last possible collision-free trigger position SL. In the even of an earlier failure of the drive of mold portion 12, gripper 16 may be stopped prior to entering the trajectory of mold portion 12, as set forth above. However, in the event of a later failure of the drive of mold portion 12, i.e. after position SL, mold portion 12 due to its inertial forces is already further off the trajectory of gripper 16, as compared with the above-specified worst case situation.

According to the illustrated preferred velocity curve for the control of gripper 16, the area between the last possible collision-free trigger position SL and position $SR_1$ is passed by gripper 16 with its maximum possible acceleration. As a result the dwell time of gripper 16 in this area is reduced. The further advancement of gripper 16 after having passed position $SR_1$ has no impact on the inventive method and, therefore, may be set differently. This depends in particular on the gripper position $SR_2$ at which gripper 16 must be brought to a standstill for unloading a finished workpiece 18 from mold portion 14. Various possible curves are indicated with reference numeral 160, 162, 164 and 166.

By minimizing the dwell time of gripper 16 in the area between the last possible stop position SL and position $SR_1$ the cycle time of the injection molding machine may be minimized within the scope of the present invention, without running the risk of collisions in the event of a failure. Furthermore, the continuing movement of the component that has to go out of the way contributes to the minimizing of the cycle time even in case of a malfunction. The same holds true for the deceleration of the respective entering component in case of a malfunction.

What is claimed is:

1. A method for controlling a motional sequence of a first movable component of a plastic material injection molding machine having a first trajectory spatially overlapping at least partially a second trajectory of a second movable component of said plastic material injection molding machine, wherein motion of said first movable component is initiated depending on an enabling signal indicative for a motional state of said second movable component, the method comprising the steps of:

a) determining a first period of time ($T_{WA}$; $T_{RE}$) between a first moment in time ($t_{FW}$; $t_{FR}$) when said enabling signal is generated and a second moment in time ($t_6$; $t_3$) when said first movable component enters said second trajectory;

b) determining a second period of time ($T_{RAmax}$; $T_{WEmax}$) between said first moment in time ($t_{FW}$; $t_{FR}$) and a third moment in time ($t_{10}$; $t_8$) when said second movable component leaves said first trajectory;

c) comparing said first period of time ($T_{WA}$; $T_{RE}$) with said second period of time ($T_{RAmax}$; $T_{WEmax}$) and generating a difference signal therebetween; and d) controlling motion of said first movable component as a function of said comparison of said first period of time ($T_{WA}$; $T_{RE}$) with said second period of time ($T_{RAmax}$; $T_{WEmax}$) such that said difference signal is smaller than a predetermined minimum tolerance value ($T_2$; $T_1$).

2. The method of claim 1, wherein one of said movable components is a first mold portion executing an opening movement and a closing movement, respectively, relative to a second mold portion, and the other one of said movable components is a gripper being adapted to be moved into and out of, respectively, a gap between said mold portions.

3. The method of claim 1, wherein at least one of said periods of time ($T_{WA}$, $T_{RAmax}$; $T_{RE}$, $T_{WEmax}$) is measured by means of a sensor.

4. The method of claim 3, wherein another one of said periods of time ($T_{WA}$, $T_{WEmax}$) is stored as a parameter in a control unit of said plastic material injection molding machine.

5. The method of claim 3, wherein at least one of said periods of time ($T_{RAmax}$; $T_{RE}$) is indicative for a motion of said gripper.

6. The method of claim 4, wherein another one of said periods of time ($T_{WA}$; $T_{WEmax}$) is indicative for a motion of said mold portion.

7. The method of claim 1, wherein at least one of said periods of time ($T_{RAmax}$; $T_{RE}$) is set depending on a change in acceleration, a displacement and/or a delay time ($t_R$) of at least one of said movable components.

8. The method of claim 1, wherein said enabling signal is generated when said second movable component has reached a predetermined trigger position ($S_{FW}$; $S_{FR}$), said trigger position ($S_{FW}$; $S_{FR}$) being set as a function of said first ($T_{WA}$; $T_{RE}$) and said second ($T_{RAmax}$; $T_{WEmax}$) period of time.

9. The method of claim 1, wherein said second period of time ($T_{RAmax}$; $T_{WEmax}$) is determined by way of a simulation simulating a failure of a drive associated with said second movable component occurring at said first moment in time ($t_{FW}$; $t_{FR}$).

10. The method of claim 1, wherein an error signal ($F_R$; $F_W$) is generated upon a failure of a drive associated with said second movable component, and motion of said first movable component is stopped or suppressed upon generation of said error signal ($F_R$; $F_W$).

11. The method of claim 1, wherein an error signal ($F_R$; $F_W$) is generated as soon as a motional sequence of said second movable component is outside a predetermined tolerance band and motion of said first movable component is stopped or suppressed upon generation of said error signal ($F_R$; $F_W$).

12. The method of claim 11, wherein said tolerance band is determined empirically by executing said motional sequence several times under production conditions prior to productively operating said injection molding machine.

13. The method of claim 12, wherein said tolerance band is measured under production conditions in predetermined time intervals and is adjusted accordingly.

14. The method of claim 1, wherein said at least one period of time ($T_{WA}$, $T_{RAmax}$; $T_{RE}$, $T_{WEmax}$) is determined repeatedly during the carrying out of the method.

15. The method of claim 1, wherein a supply voltage for a drive associated with said second movable component is buffered such that a drive for said second movable component may be maintained even upon failure of said supply voltage until said second movable component has left said first trajectory.

16. The method of claim 1, wherein said said first movable component is braked down at maximum deceleration rate upon a malfunction within said motional sequence of said second movable component.

17. The method of claim 1, wherein said first movable component is braked with a first brake means under normal operational conditions and is braked down with a second brake means at an increased deceleration rate in case of a malfunction.

18. The method of claim 1, wherein said frist movable component is first accelerated at a lower rate of acceleration upon receipt of said enabling signal, and is then accelerated at a maximum rate of acceleration upon passing a last possible collision-free stop point (SL) at least until entering into said second trajectory.

19. The method of claim 1, wherein the trajectory of one of said movable components is directed essentially vertically, said one movable component entering the trajectory of the other movable component from above, said one movable component being secured from falling down by a stop means in case of a malfunction.

20. The method of claim 1, wherein a common control unit is provided for said first and said second movable component, said motional sequences of said movable components being compared within said control unit and a malfunction signal being generated in case of a malfunction.

21. A plastic material injection molding machine comprising a first and a second movable component, said components having a first and a second trajectory, respectively, overlapping each other at least partially, a control unit for generating an enabling signal for the motion of said first movable component depending on the motional state of said second component, said machine having:

a) means for determining a first period of time ($T_{WA}$; $T_{RE}$) between a first moment in time ($t_{FW}$; $t_{FR}$) when said enabling signal is generated and a second moment in time ($t_6$; $t_3$) when said first movable component enters said second trajectory;

b) means for determining a second period of time ($T_{RAmax}$; $T_{WEmax}$) between said first moment in time ($t_{FW}$; $t_{FR}$) and a third moment in time ($t_{10}$; $t_8$) when said second movable component leaves said first trajectory;

c) means for comparing said first period of time ($T_{WA}$; $T_{RE}$) with said second period of time ($T_{RAmax}$; $T_{WEmax}$) and generating a difference signal therebetween; and d) means for controlling motion of said first movable component as a function of said comparison of said first period of time ($T_{WA}$; $T_{RE}$) with said second period of time ($T_{RAmax}$; $T_{WEmax}$) such that said difference signal is smaller than a predetermined minimum tolerance value ($T_2$; $T_1$).

22. The machine of claim 21, wherein at least one external brake means is provided for braking down at least one of said movable components in case of a malfunction.

23. The machine of claim 22, wherein said brake means is configured as a friction brake.

24. The machine of claim 22, wherein said brake means is configured as a bumper.

* * * * *